May 11, 1954

E. J. ENS 2,677,993

METHOD AND APPARATUS FOR PLEATING BLANKS OF
LAMINATED SHEET MATERIAL AND PREFORMED
BLANKS OF LAMINATED SHEET MATERIAL

Filed June 28, 1949

INVENTOR.
Emil J. Ens

BY

ATTORNEYS

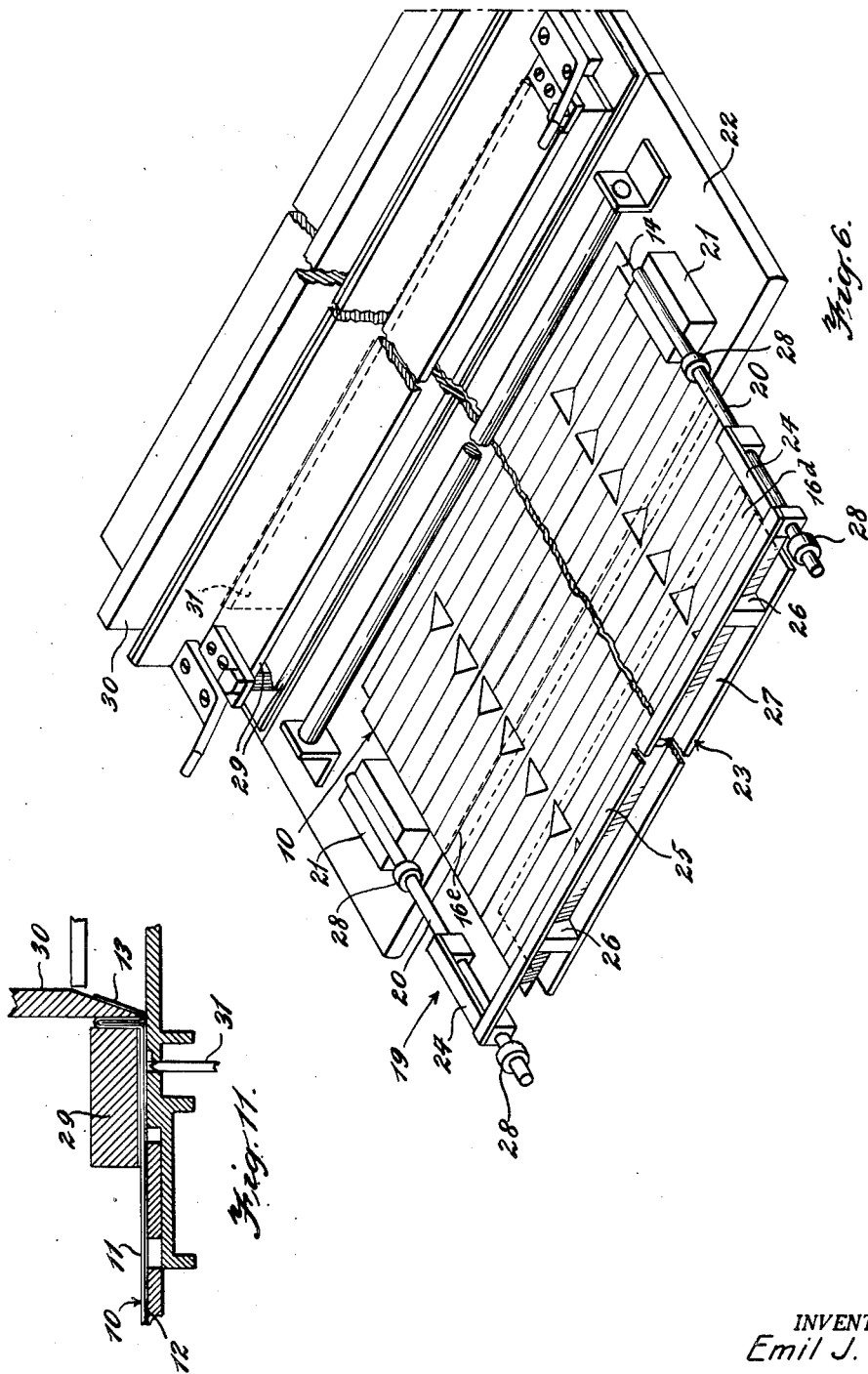

May 11, 1954
E. J. ENS
2,677,993
METHOD AND APPARATUS FOR PLEATING BLANKS OF
LAMINATED SHEET MATERIAL AND PREFORMED
BLANKS OF LAMINATED SHEET MATERIAL
Filed June 28, 1949
3 Sheets-Sheet 3
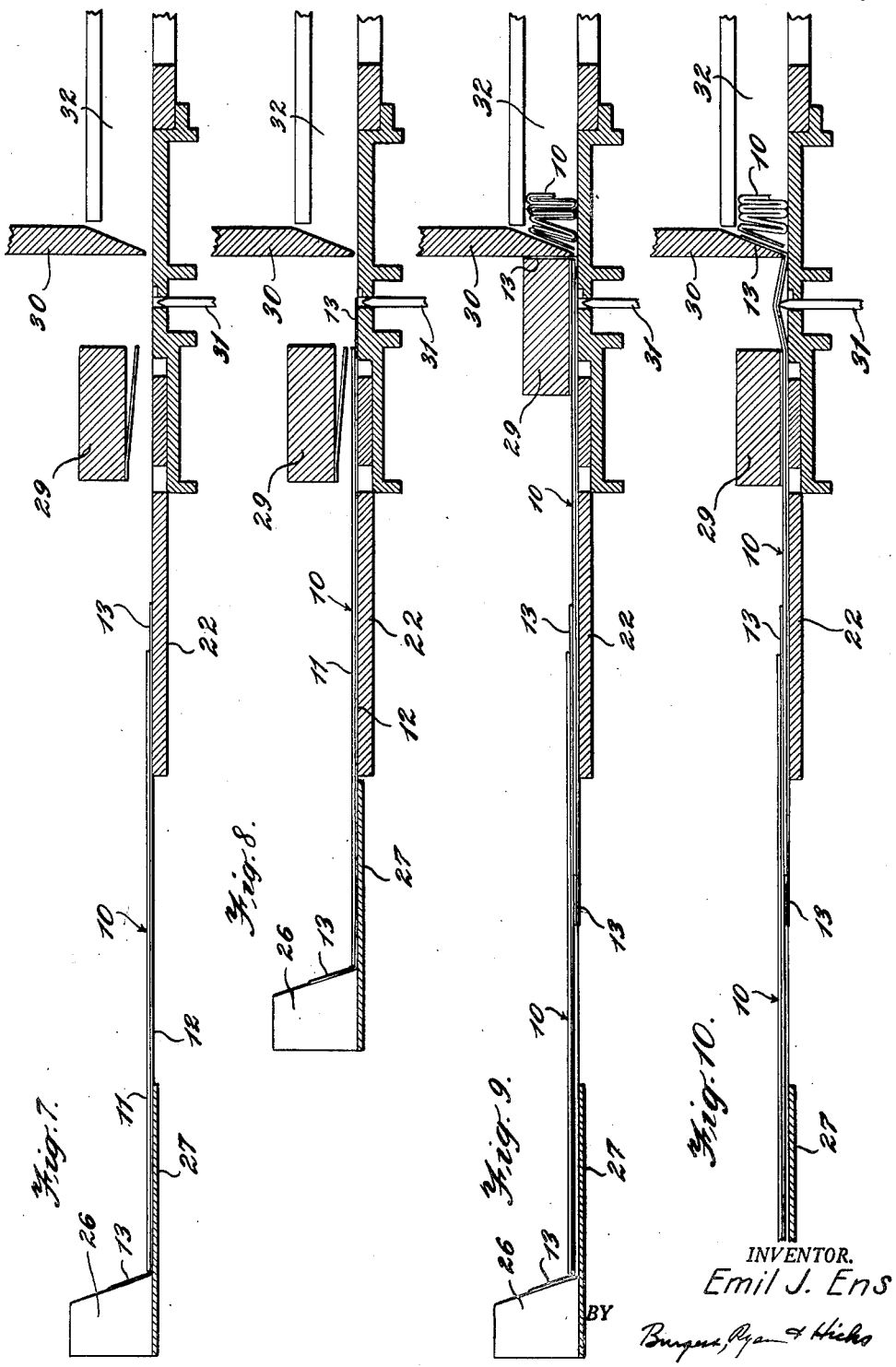
INVENTOR.
Emil J. Ens
BY
Burgess, Ryan & Hicks
ATTORNEYS Patented May 11, 1954

2,677,993

UNITED STATES PATENT OFFICE 2,677,993

METHOD AND APPARATUS FOR PLEATING BLANKS OF LAMINATED SHEET MATERIAL AND PREFORMED BLANKS OF LAMINATED SHEET MATERIAL

Emil J. Ens, Newark, N. J., assignor to Magnus Harmonica Corporation, Newark, N. J., a corporation of New Jersey Application June 28, 1949, Serial No. 101,894

6 Claims. (Cl. 93—1)

1

The present invention relates to improvements in method and apparatus for feeding blanks of laminated sheet material to a pleating machine and a preformed blank of laminated sheet material. My invention relates more particularly to a method and an apparatus for continuously feeding consecutive blanks of prescored, laminated sheet material to a pleating machine and to a preformed blank of laminated sheet material that has been prescored for pleating.

An object of the invention is to provide a method and an apparatus for feeding blanks of laminated sheet material to a pleating machine in such a way that the pleating of consecutive blanks may be carried out continuously without interruption or stopping of the pleating machine with the blanks being pleated along prescored lines. A further object of the present invention is to provide a preformed blank of laminated sheet material that is prescored for pleating so that it may be folded into a bellows for an accordion or the like.

Various other objects and advantages of my invention will be apparent and best understood from the following description and the accompanying drawings in which:

Fig. 6 is a perspective view of a fixture and a portion of a pleating machine for feeding blanks of prescored, laminated sheet material to the pleating machine in accordance with my invention;

Figs. 7, 8, 9, 10 and 11 are fragmentary views in partial section diagrammatically illustrating the sequence of steps in feeding the preformed blanks of prescored laminated sheet material to the pleating machine in accordance with my invention.

Figure 1:
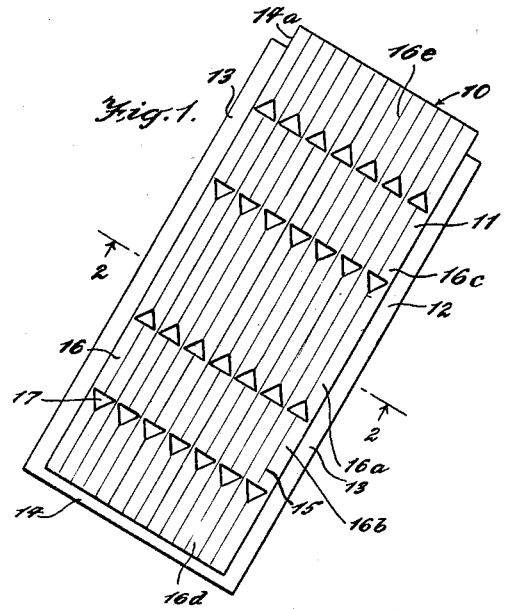
Fig. 1 is a perspective view of a blank of prescored, laminated sheet material embodying my invention.
Figure 2:
Fig. 2 is a section view taken along the line 2—2 of Fig. 1 on an enlarged scale.
Figure 3:
Fig. 3 is an end view of a blank of laminated sheet material such as illustrated in Fig. 1 that has been pleated.

Referring now to the drawings in detail, Fig. 1 illustrates a preformed blank 10 of laminated sheet material. The blank 10 consists of a ply

2

11 of relatively stiff paper or cardboard that is secured by a suitable adhesive to a ply 12 of flexible material. The paper ply 11 reinforces or stiffens the flexible ply 12 and serves to support and maintain the flexible ply in a desired shape when the blank is pleated and folded. The flexible ply 12 may be made from any suitable material; for example, a pyroxylin coated fabric such as leatherette, a fabric coated with a plastic film or even a plastic film alone may be used. Thus, the flexible ply 12 may be made so that it will be impervious to light or air.

The paper ply 11 is superimposed and positioned on the flexible ply 12 so that flaps 13 of the flexible ply 12 extend beyond the edges of the paper ply 11 along opposite sides thereof and a flap 14 of the flexible ply 12 extends beyond the edge of the paper ply 11 at one end thereof. A flap 14a of the paper ply 11 extends beyond the edge of the flexible ply 12 at the opposite end thereof. The edge of the flap 14a may be utilized as a guide in feeding the blank to the pleating machine and as will be described, the flexible flap 13 at the leading edge of the blank permits the blanks 10 to be fed to the pleating machine without interrupting its operation.

Figure 4:
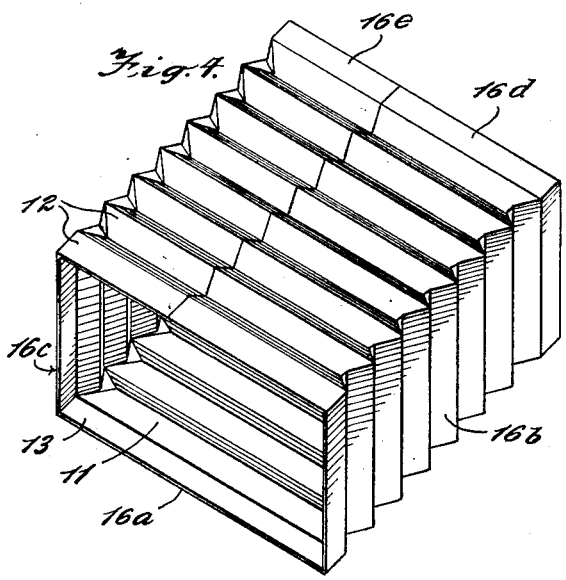
Fig. 4 is a perspective view of a bellows formed from a pleated blank of laminated sheet material such as illustrated in Fig. 1.
Figure 5:
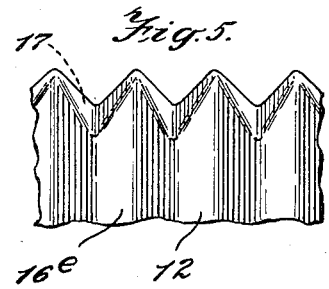
Fig. 5 is a fragmentary view showing the details of a corner fold of the bellows illustrated in Fig. 4.

The paper ply 11 is scored along lines 15 running parallel to its side edges and the blank 10 is introduced to the pleating machine so that it will be pleated along the score lines 15. The paper ply 11 is also scored so that it is divided into panels 16 which when the pleated blank is folded into a rectangular shape, form the sides of a bellows; namely, a bottom 16a, sides 16b and 16c and a top 16d and 16e. In order to prevent the pleats in the paper ply 11 from interfering with each other at the corners formed by adjoining sides of bellows when the pleated blank 10 is folded into rectangular shape, the paper ply 11 is provided with triangular openings or cut out portions 17 located at the ends of alternate score lines 15 along one of the adjoining edges of each of the panels 16. In such a case, the bases of the triangular openings 17 function as score lines dividing the blank into panels and permit the pleated blank 10 to be folded into rectangular shape with the pleats in the flexible ply 12 on one side of the bellows being accommodated between the pleats in the adjoining sides of the bellows. Thus, the pleated blank 10 may be readily folded along the edges of the panels 16 to form a rectangular bellows such as is illustrated in Fig. 4. The provision of triangular shaped openings for this purpose is known in the art, being shown for example in U. S. Patent No. 1,908,531 issued May 9, 1933 and the openings, as such, do not form a part of my invention.

When the pleated blank 10 is folded into rectangular shape, the flap 14a of the paper ply 11 overlaps the opposite end of the paper ply on the inside of the bellows and these overlapping portions of the paper ply 11 may be joined by a suitable adhesive to form a seam which is air tight or through which light will not pass. The flap 14 at the end of the flexible ply 12 also overlaps the opposite end of the flexible ply 12 on the outside of the bellows and may be secured thereto by a suitable adhesive to form a finished seam.

The flexible flaps 13 of the flexible ply 12 that extend beyond the side edges of the paper ply 11 provide surfaces to which end closures (not shown) for the bellows may be suitably attached. In addition, the flexible flap 13 at the leading edge of the blank 10 provides a means for holding the blank 10 while the initial pleat is formed along the score lines 15 after the blank has been fed to the pleating machine in proper alignment with the pleating blades so that consecutive blanks 10 may be fed to the pleating machine without interrupting the operation of the machine.

The pleating of the blanks 10 may be accomplished on any suitable pleating machine. Such pleating machines are known in the art and since they do not form a part of my invention, it will not be necessary to describe such a machine in detail here. One form of such a machine is shown, for example, in U. S. Patent No. 671,791 issued April 7, 1901. In such machines, the material that is to be pleated is usually fed from rolls. When a new roll or sheet of material is introduced into the machine, the machine is generally stopped and the machine is operated by hand while the leading edge of the material to be pleated is put in position for the formation of the initial pleat. The stopping of the machine in this manner for individual blanks would slow down the production of the machine to such an extent that the cost of pleating such blanks would be prohibitive. In accordance with my invention a pleat is not formed in the blank on the initial cycle of the machine, but this operation of the machine brings the blank to a position where the blank will be held in proper alignment for the formation of the first pleat.

For the purpose of introducing the blanks 10 to the machine, a fixture 19 is mounted on the front end of the pleating machine, as shown best in Fig. 6. The fixture 19 consists of a pair of members or rods 20 that are supported in spaced relation to each other by blocks 21 secured to the table or bed plate 22 of the machine. A frame 23 is slidably mounted on the rods 20 at the end thereof. The frame 23 includes sliders 24 that are slidably mounted on the rods 20 and the sliders 24 carry a cross bar 25 that extends between the rods 20. The cross bar 25 carries two downwardly extending supports or legs 26 from which a platform 27 is supported. Stops 28 are adjustably positioned on the rods 20 and are located on opposite sides of the sliders 24 so as to limit the movement of the frame 23 as desired for various widths of blanks.

In feeding one of the preformed blanks 10 of prescored, laminated sheet material that have been described to the pleating machine, the blank 10 is placed so that it rests on the platform 27 with its edge on one side abutting the inner sides of the legs 26 and with the flexible flap 13 on the butting edge of the blank extending upwardly against the legs 26. This flap 13 may be gripped by the operator when the fixture 19 and the blank 10 are moved forward to feed the blank into the pleating machine. If desired, the inner sides of the legs 26 may be sloped upwardly from the platform 27 so that the flap 13 may be gripped more easily.

Fig. 7 illustrates a blank 10 that has been placed on the fixture 19 in position for introduction into the pleating machine. As will be seen from Figs. 6 and 7, the flexible flap 13 at the edge of the leading side of the blank 10 is positioned so that it will enter the pleating machine initially.

The pleating machine, as illustrated, has a pushing blade 29 that engages with and carries the material that is to be pleated forward. As pushing blade 29 advances the material to be pleated is normally held by a hold down 30. Thus, the material between the pushing blade 29 and the hold down 30 is raised and is pressed between the end of the pushing blade 29 and the side of the holding jaw 30 to form a pleat. As the pushing blade 29 moves forward, a folding blade 31 is raised and lowered in timed relation to the operation of the pushing blade 29 to start the fold at the proper point in the material being pleated.

The sequence of steps that is followed in accordance with my invention for introducing the preformed blanks 10 consecutively to the pleating machine is illustrated best in Figs. 7 to 11 and is as follows: First, the prescored blank 10 is placed on the platform 27 with its rear edge abutting the legs 26 and with the flap 14a bearing on one of the blocks 21 as a guide. Also, one of the flexible flaps 13 is located at the leading edge of the blank. For this purpose, the blank 10 may be provided with one flexible flap 13 at its leading edge. When the pleating machine reaches a point in its cycle of operation where the pushing blade 29 is raised and is being retracted, the operator slides the frame 23 carrying the blank 10 forward on the rods 19 until the frame strikes the forward stops 28. The stops 28 may be adjusted for various widths of blanks so that this movement of the frame 23 positions the blank 10 with the leading edge of the paper ply 11 aligned with the forward edge of the pushing blade 29 when the pushing blade 29 is in its fully retracted position as shown in Fig. 8.

The pushing blade 29 is then lowered and brought into engagement with the blank 10. The pushing blade 29 is then advanced toward the hold down 30 carrying the blank 10 with it, but it does not form a pleat in the blank 10 at this time as the flexible flap 13 is merely forced against the side of the hold down 30 as shown in Fig. 9. When the pushing blade 29 has completed its forward stroke, the hold down 30 is raised and this permits the flexible flap 13 to project beyond the hold down 30 into a discharge passageway 32 into which the preceding pleated blank has passed. This movement of the blank 10 places the leading edge of the paper ply 11 in line with the front of the hold down 30 so that when the hold down 30 is now lowered, it engages with and holds the flexible flap 13 at the point where it joins the paper ply 11. The engagement of the hold down 30 with the flexible flap 13 holds the blank 10 in position for the formation of the initial pleat on the next cycle of the machine.

As soon as the hold down 30 engages with the flexible flap 13 at the point where it joins the paper ply 11, the pushing blade 29 is raised and retracted. When the pushing blade 29 is retracted, it again lowers into engagement with the blank 10 and is then moved forward to fold the blank 10 into a pleat. The score lines 15 in the blank 10 are arranged so that the pushing blade 29 engages with the blank 10 at alternate score lines and the folding blade 31 engages with the blank 10 at the intermediate score lines 15 as it is raised, as shown in Fig. 10, to start the center fold of the pleat. After the center fold of the pleat has been started, the folding blade 31 is withdrawn so that the pushing blade 29 may complete its forward stroke. When the pushing blade 29 completes its forward stroke, the blank 10 is folded along the score lines 15 to form a pleat which is pressed between the end of the pushing blade 29 and the front of the hold down 30 as shown in Fig. 11.

After a pleat is formed, the hold down 30 is raised and pleated portion of the blank 10 passes into the passageway 32. This cycle of operations is repeated until the end of the blank 10 is reached at which time a second blank 10 may be fed to the pleating machine in a like manner without stopping or interrupting the operation of the pleating machine. As shown in Figs. 9 and 10, the new blank may be placed in position on the fixture 19 at any time after the pleating of the preceding blank has been commenced.

It will be understood that those skilled in the art may make various changes and modifications in the embodiment of my invention as illustrated and described herein without departing from the scope of my invention as defined by the following claims.

I claim:

1. In a method of pleating a prescored blank of laminated sheet material, said blank having a ply of reinforcing and shape retaining material with score lines parallel to the side edges thereof and a ply of flexible material secured to the reinforcing ply with the flexible ply having a portion forming a flap extending beyond at least one of the side edges of the reinforcing ply, the steps of placing said blank with the leading edge of the reinforcing ply in alignment with the forward edge of a pushing blade in a pleating machine when said blade is in retracted position and with the flap of flexible material extending beyond the edge of the pushing blade, then engaging the blank by the pushing blade and advancing the pushing blade and the blank to a position where the flap of flexible material is interposed between the end of the pushing blade and a hold down, then raising the hold down and permittting the flap of flexible material to project beyond the hold down, then holding the blank by lowering the hold down into engagement with the flap of flexible material adjacent the leading edge of the reinforcing ply and then raising the pushing blade and moving it to its retracted position for reengaging the blank at a score line spaced from the leading edge of the reinforcing ply, said score line being the second score line from the point at which the hold down engages with the blank, and then advancing the pushing blade and folding the portion of the blank between the pushing blade and the hold down to form the initial pleat in the blank.

2. The method of pleating consecutive blanks of prescored laminated sheet material in a pleating machine without interrupting the operation of the machine which includes the steps of sliding a laminated blank consisting of a ply of reinforcing material having spaced score lines therein parallel to its leading edge and a ply of flexible material with a portion forming a flap extending beyond the leading edge of the reinforcing ply to a position where the leading edge of the reinforcing ply is in alignment with the forward edge of a pushing blade when said blade is in a retracted position, then advancing the blank by engagement of the pushing blade with the reinforcing ply with the flap of flexible material at the leading edge of the blank interposed between the end of the pushing blade and a hold down, then raising the hold down and permitting the flexible flap to project beyond the hold down, then moving the hold down into holding engagement with the flexible flap, said hold down engaging said flexible flap immediately adjacent the leading edge of the reinforcing ply whereby when the pushing blade is returned to its retracted position it engages with the reinforcing play at a score line spaced from the leading edge of the blank, said score line being the second score line from the point at which the hold down engages with the blank, advancing the pushing blade toward the hold down to fold the blank along a score line located between the forward edge of the pushing blade and the hold down forming a folded pleat therein, said hold down and pushing blade repeating their cycle of operations until the end of a blank is reached at which time the leading edge of a second blank is slid into the position where its leading edge is aligned with the forward edge of the pushing blade.

3. The method of pleating a preformed blank of laminated sheet material, said blank having a ply of reinforcing and shape retaining material and a ply of flexible material secured to said reinforcing ply with the flexible ply having a portion forming a flap extending beyond the leading edge of the reinforcing ply that is characterized by initially advancing the blank without forming a pleat therein by the advancing movement of a pushing blade which cooperates with a hold down in forming pleats, raising the hold down to permit the flap of flexible material to project therebeyond, and then holding said blank for the formation of an initial pleat therein by bringing the hold down into holding engagement with the flap of flexible material adjacent the leading edge of the reinforcing ply.

4. In a pleating machine having a set of pleat forming blades, a fixture for feeding a blank of laminated sheet material to said set of pleat forming blades comprising a frame slidably mounted on said pleating machine, said frame being movable toward and away from said set of pleat forming blades in said machine, means carried by said frame for supporting a blank of laminated sheet material in alignment with the pleat forming blades, said blank being positioned for initial engagement with one of said blades upon movement of the frame toward the blades and an adjustable stop engaging with and limiting the movement of the frame when the frame is moved toward the pleat forming blades.

5. In a pleating machine having a set of pleat forming blades, a fixture for feeding a blank of laminated sheet material to said set of pleat forming blades comprising a frame slidably mounted on said pleating machine, said frame being movable toward and away from said set of pleat forming blades in said machine, a platform carried by said frame, said platform being arranged to support a blank of laminated sheet material thereon with the leading edge of said blank in alignment with the pleat forming blades, said blank being positioned for initial engagement with one of said blades upon movement of the frame toward the blades and an adjustable stop engaging with said frame upon movement of the frame toward the pleat forming blades.

6. In a pleating machine having a set of pleat forming blades, a fixture for feeding a blank of laminated sheet material to said set of pleat forming blades comprising a pair of fixture supporting members mounted in spaced relation on said pleating machine, a slider carried by each of said members, a bar carried by and extending between said sliders, a platform carried by said bar, said platform being positioned to support a blank of laminated sheet material in alignment with said set of pleat forming blades in the pleating machine, said blank being positioned for initial engagement with one of the pleat forming blades upon movement of the platform toward the blades and an adjustable stop carried by one of the fixed members and engaging with the slider carried thereon upon movement of the platform toward the set of pleat forming blades.

References Cited in the file of this patent

UNITED STATES PATENTS

| Number | Name | Date |
|---|---|---|
| 564,893 | Kippels et al. | July 28, 1896 |
| 777,943 | De Witta | Dec. 20, 1904 |
| 981,200 | Kroedel | Jan. 10, 1911 |
| 1,578,330 | Lipton | Mar. 30, 1926 |
| 1,754,955 | Kruse | Apr. 15, 1930 |
| 1,908,531 | Noble | May 9, 1933 |
| 2,067,505 | Sieger | Jan. 12, 1937 |
| 2,379,665 | Stone | July 3, 1945 |
| 2,387,163 | Maxant | Oct. 16, 1945 |
| 2,404,162 | Brown | July 16, 1946 |
| 2,437,079 | Curtiss | Mar. 2, 1948 |
| 2,495,130 | Pilliner | Jan. 17, 1950 |